Dec. 27, 1949 J. H. WORDEN 2,492,609
BRAKE FOR PLUMB BOB REELS
Filed July 1, 1947

Inventor
John H. Worden

By *Clarence A. O'Brien and Harvey B. Jacobson*
Attorneys

Patented Dec. 27, 1949

2,492,609

UNITED STATES PATENT OFFICE 2,492,609

BRAKE FOR PLUMB BOB REELS

John H. Worden, Vancouver, Wash.

Application July 1, 1947, Serial No. 758,303

3 Claims. (Cl. 242—156)

1

The present invention relates to new and useful improvements in plumb bobs and more particularly to a reel for the plumb bob line and a holder for the plumb bob when the latter is not in use.

An important object of the present invention is to provide a plumb bob holder in which the plumb bob may be housed to prevent unwinding of the line from the reel when not in use and also to provide a housing for the reel having a foldable handle together with an expansible hub formed as a part of the housing and on which the wheel is rotated, the handle being housed in the hub to function as a brake for holding the reel against idle rotation.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
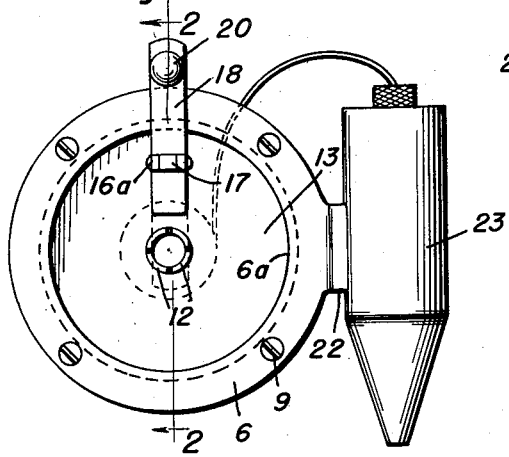
Figure 1 is a side elevational view.
Figure 2:
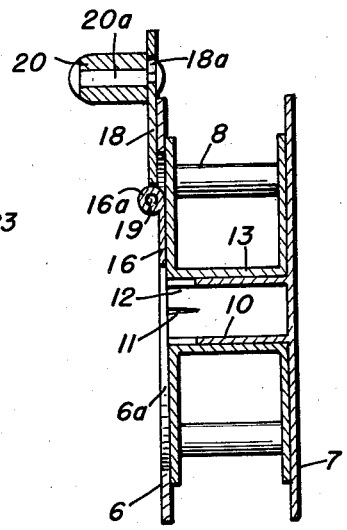
Figure 2 is a sectional view taken on the line 2—2 of Figure 1.
Figure 3:
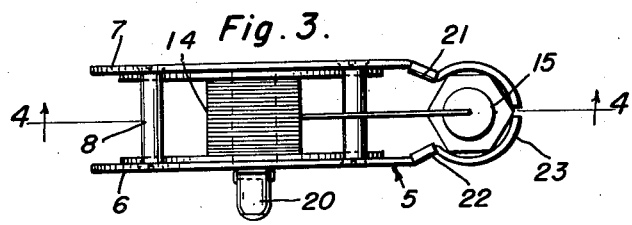
Figure 3 is a top plan view.
Figure 4:
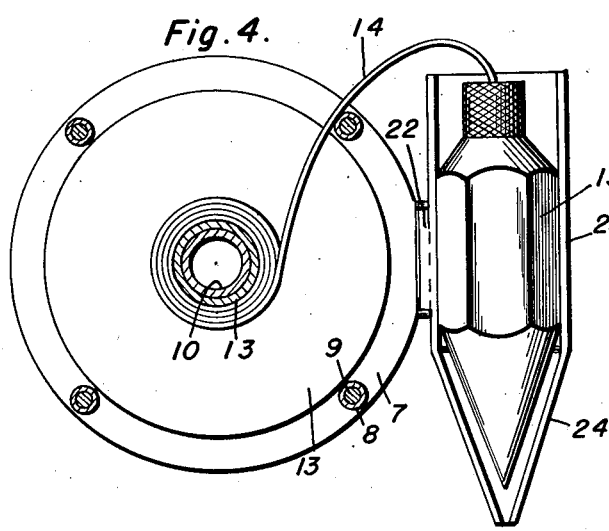
Figure 4 is a sectional view taken on the line 4—4 of Figure 3.
Figure 5:
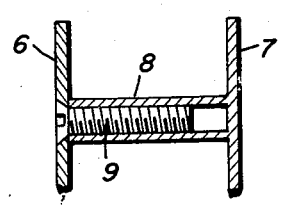
Figure 5 is an enlarged fragmentary sectional view of the spacing means and connection for the sides of the housing.

Referring now to the drawings in detail wherein for the purpose of illustration I have disclosed a preferred embodiment of the invention the numeral 5 designates a reel housing generally which is composed of a pair of side plates 6 and 7, one of the side plates having spacing sleeves 8 integrally formed therewith or suitably connected thereto for threadedly receiving attaching screws 9 carried by the other of said side plates to secure the side plates to each other.

The side plate 7 is also formed with a tubular or hollow hub 10 having its outer end split as shown at 11 to provide a plurality of resilient fingers 12 for a limited expanding movement of the hub. A reel 13 is rotatably mounted on the hub 10 between the side plates 6 and 7 for winding a plumb bob cord 14 thereon and to the outer end of which a conventional plumb bob 15 is attached.

2

The side plate 6 is formed with a relatively large central opening 6a exposing the adjacent side of the reel 13 and to which is suitably secured a hinge plate 16 having one edge rolled to form hinge bearings 16a alined with similar rolled bearings 17 on a hinge plate 18, and through which a hinge pin 19 is inserted to pivotally connect the hinge plate 18 to the hinge plate 16. The hinge plate 18 is provided with a tapered handle 20 at its outer end for rotating the reel 13.

The handle 20 is swingable inwardly into a folded position for insertion in the open end of the hub 10 and in tight fitting engagement therewith whereby to expand the fingers 12 into frictional engagement with the hub of the reel 13 to thus function as a brake for holding the reel against idle rotation. The handle 20 is carried by a rivet or pin 20a which is self adjusting in a slot 18a in the plate 18 to facilitate entry of the handle in the hub 10.

Arms 21 and 22 project radially from the peripheral edge of the plates 6 and 7 in spaced parallel relation with respect to each other and on the outer end of each arm is formed a semi-cylindrical member 23 tapering at one end as shown at 24, the member 23 cooperating to provide a housing for the plumb bob 15 which is frictionally held therein.

In the operation of the device the plumb bob 15 is removed from the housing member 23, the handle 20 removed from the hub 10 and the cord 14 may then be freely paid out on the reel 13.

When the plumb bob is not in use the cord 14 is wound on the reel, the plumb bob 15 inserted in the holder members 23 and handle 20 swung downwardly to insert the same in the open end of the hub and thus apply the brake to hold the reel against idle rotation.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A reel including a hollow hub, a housing for the reel, and internal braking means for the hub of the reel, said braking means comprising an expansible hub for the housing on which the reel hub is journaled, and an expanding member carried by the reel for expanding and contracting movement in said expansible hub.

2. A reel including a hollow hub, a housing for the reel, and internal braking means for the hub of the reel, said braking means comprising an expansible hub for the housing on which the reel is journaled, and an expanding member pivotally carried by the reel for movement into and out of expanding position in the hub of the housing.

3. A reel including a hollow hub, a housing for the reel, and internal braking means for the hub of the reel, said braking means comprising an expansible hub for the housing on which the reel is journaled, and a handle pivoted to the reel for movement into and out of expanding engagement in the hub of the housing.

JOHN H. WORDEN.

REFERENCES CITED

The following references are of record in the file of this patent:

UNITED STATES PATENTS

| Number | Name | Date |
|---|---|---|
| 476,883 | Kuhn | June 14, 1892 |
| 932,218 | Wilson | Aug. 24, 1909 |
| 1,043,295 | Burns | Nov. 15, 1912 |
| 1,098,033 | Friendship | May 26, 1914 |

FOREIGN PATENTS

| Number | Country | Date |
|---|---|---|
| 307,202 | Great Britain | Mar. 7, 1929 |